United States Patent [19]

Hale et al.

[11] 4,202,175
[45] May 13, 1980

[54] HYDRAULIC CONTROL SYSTEM FOR A DUMP TRUCK

[76] Inventors: John D. Hale; Frank L. Hale, both of P.O. Box 11, Swisshome, Oreg. 97480

[21] Appl. No.: 947,443

[22] Filed: Oct. 2, 1978

Related U.S. Application Data

[63] Continuation-in-part of Ser. No. 796,741, May 13, 1977, abandoned.

[51] Int. Cl.² ............................................. F15B 15/18
[52] U.S. Cl. ................................. 60/477; 60/494; 60/DIG. 2; 91/459
[58] Field of Search ........... 60/477, 481, 494, DIG. 2; 91/392, 400, 459; 298/22 C

[56] References Cited

U.S. PATENT DOCUMENTS

| | | | |
|---|---|---|---|
| 2,276,591 | 3/1942 | Ray | 60/DIG. 2 |
| 2,374,909 | 5/1945 | Williams | 60/DIG. 2 |
| 3,774,726 | 11/1973 | Bredberg | 91/400 X |
| 3,864,910 | 2/1975 | Mechin | 60/494 X |
| 3,902,403 | 9/1975 | Clarke et al. | 91/459 X |
| 4,023,466 | 5/1977 | Strassheimer | 60/494 X |

*Primary Examiner*—Edgar W. Geoghegan
*Attorney, Agent, or Firm*—James D. Givnan, Jr.

[57] ABSTRACT

A system including a hydraulic pump unloaded by a first system relief valve which is piloted by a remotely controlled two position directional valve. A second system relief valve in a hydraulic cylinder exhaust line is also of the pilot operated type. A manually operable valve in the truck cab pilots the second system relief valve to provide the operator precise manual control of cylinder discharge and speed of dump body lowering. A modified system includes a solenoid actuated two position directional valve for zero back pressure pump unloading. A hydraulic lift cylinder exhausts fluid during dump body lowering past pilot controlled relief valve the pilot line of which is branched permitting separate or combined control of the pilot flow by a manual or a solenoid actuated valve. A further modified system for both truck and trailer dump body control includes a pilot operated relief valve controlled by a solenoid valve for dumping pump output at low pressure. Truck and trailer dump body sub-systems are identical including both solenoid actuated and manually actuated valves to enable precise control of both raising and lowering speeds of the dump body from the truck cab.

9 Claims, 4 Drawing Figures

HYDRAULIC CONTROL SYSTEM FOR A DUMP TRUCK

BACKGROUND OF THE INVENTION

The present application is a continuation-in-part application filed during the pendency of a copending application bearing Ser. No. 796,741 having the same title and filed by the same parties on May 13, 1977 and now abandoned.

The present invention concerns control systems for hydraulically actuated dump bobies of dump trucks.

The dump body or load carrying box of a dump truck is conventionally supported by the truck chassis in a pivoted manner enabling one end of the dump body to be hydraulically elevated for purposes of discharging the dump body load. Normally a single acting hydraulic cylinder or cylinders exert forces on the dump body to elevate same to a discharge position and, oppositely, cylinder rod retraction controls the lowering of the emptied dump body. Hydraulic cylinder controls are normally actuated by the truck operator through a variety of levers, push rods and the like external of the truck cab which are subject to wear, misalignment and accidental actuation, all contributing to less than optimum control and sometimes injury causing dump body movement. While some hydraulic control systems have been combined with electrical components, the resulting systems have not found wide acceptance for one reason or another. A suspected reason for such is perhaps the severe operating conditions encountered by dump trucks.

SUMMARY OF THE PRESENT INVENTION

The present invention is embodied within a control system regulating fluid flow to and from the hydraulic cylinder or cylinders of a dump truck.

The present system is desirably powered by the standard accessory powering pump of a dump truck. A system relief valve normally serves to divert pump output back to the oil reservoir under minimal back pressure. An unloading valve serves to pilot the system relief valve to unload the pump or, alternatively, direct pump output toward the hydrualic cylinder controlling the dump body. The unloading valve is remotely controlled by the truck operator and enables precise dump body positioning. A limit control switch actuated by the dump body limits dump body elevation. In lowering of the dump body, a cylinder relief valve is piloted to a cylinder unloading mode by a manually variable flow control valve which provides the operator a high degree of control over the dump body lowering speed.

Important objectives of the present hydraulic system include the provision of a control system whereby the hydraulic pump providing power for the dump body elevation may be unloaded under low back pressure when not in use; the provision of a two way, solenoid actuated valve which pilots the system relief valve whereby the truck operator may control, from the cab, dump body raising movement via remote control of said two way valve; the provision of a dump body control system wherein a manually operated flow valve in the truck cab serves to pilot a cylinder relief valve thereby providing operator manual control over cylinder retraction during lowering of the dump body for rapid initial dump body lowering followed by slowed lowering to avoid impacting of the dump body against the truck frame; the provision of a modified system wherein cylinder relief valve is alternatively piloted by either a directional control valve or a manually adjusted flow control valve for dump body regulation; the provision of a modified system wherein both the dump body of a truck and of a trailer may be regulated both in their raising and lowering directions of travel by means of directional control valves and cylinder serving lines.

DETAILED DESCRIPTION OF THE PREFERRED EMBODIMENTS

Figure 1:
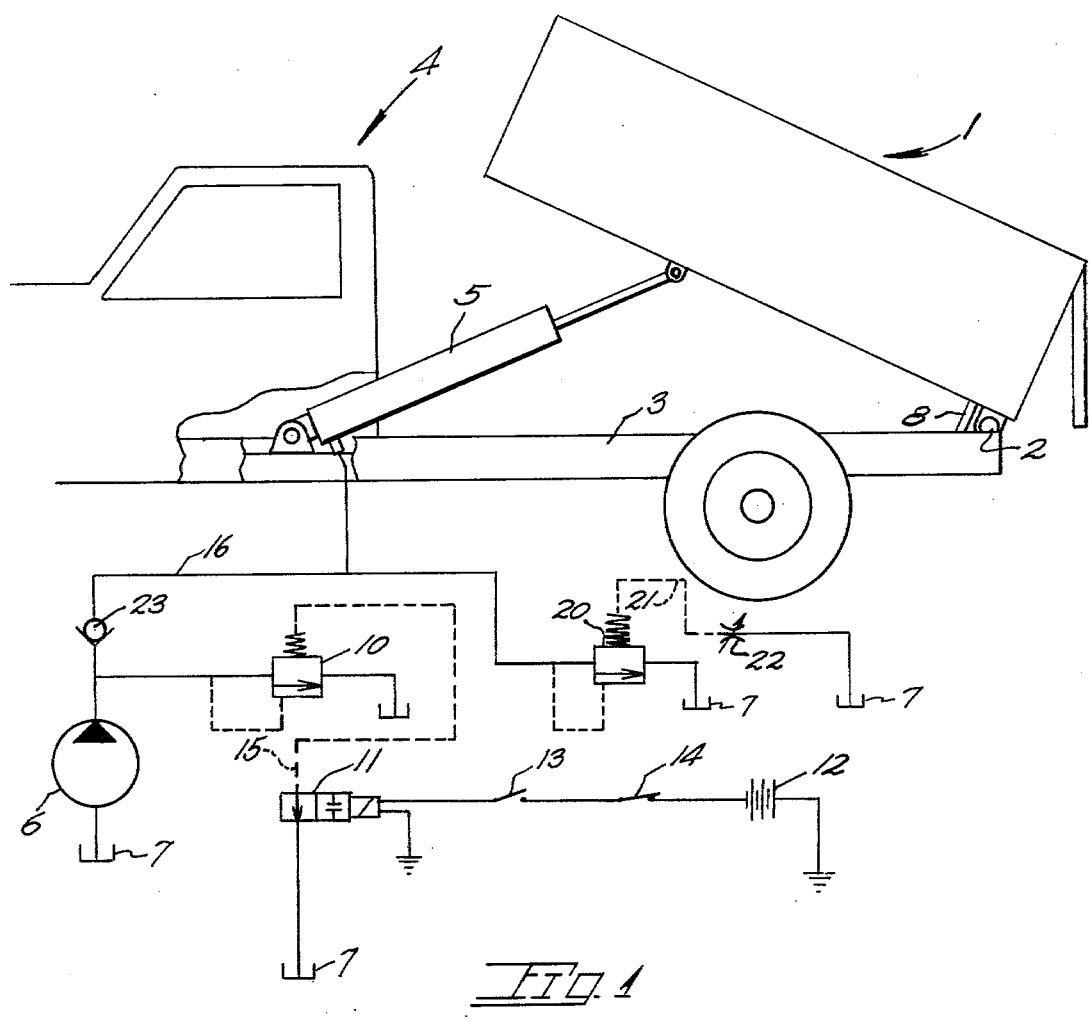
FIG. 1 is a schematic of a dump body control system.
Figure 2:
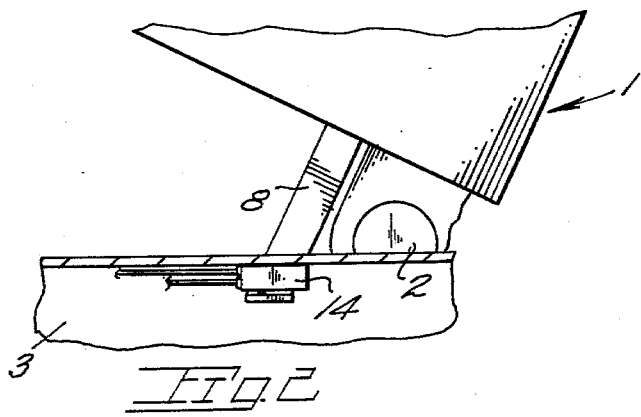
FIG. 2 is an enlarged detailed view of a chassis mounted limit switch for actuation by a dump body attachment.

With continuing attention to the drawing wherein applied reference numerals indicate parts similarly identified in the following description, the reference numeral 1 indicates generally a dump body tiltably mounted at 2 in the conventional manner to the frame 3 of a dump truck 4. A hydraulic cylinder and rod 5 impact lifting forces to the dump body and oppositely upon retraction regulate lowering of the dump body to rest on the truck frame. A truck accessory pump is indicated at 6 drawing from a reservoir 7. The foregoing is intended to be typical of dump truck construction.

In the present system a pump relief valve 10 of the pilot operated type normally unloads pump 6. A two-way directional control valve 11 is actuated by a solenoid, controlled in a remote manner, by later described electrical components. Two-way, directional control valve 11 controls or pilots relief valve 10 to dump pump output back to reservoir 7 under low back pressure.

Solenoid actuated valve 11 is in circuit with an electrical power source 12, which may be the truck battery, via an operator controlled switch 13 and a dump body limit switch 14, actuated by dump body 1 as later explained. Switch 13 is within the truck cab for convenient operator control while switch 14 is in proximity of the dump body so as to interrupt the circuit to solenoid actuated valve 11 upon the dump body reaching maximum elevation whereat an arm 8 contacts switch 14.

To direct the pump output to hydraulic cilinder 5 for elevating the dump body, switch 13 is closed by the truck operator to close off and pressurize a pilot line at 15 which in turn, positions system remote pilot relief valve 10 into a high pressure mode to interrupt dumping of the pump output. Pump output is now routed via a line 16 into the base end of cylinder 5 resulting in cylinder piston rod extension and elevation of the dump body. Lifting movement of the dump body is terminated by limit switch 14 being opened to reposition directional control valve 11.

Dump body lowering is regulated by a cylinder remote pilot relief valve 20 with a pilot line 21 in communication with a manually variable flow control valve 22 which is located in the truck cab for ease of manual operator control. Closure of variable flow control valve 22 pilots cylinder relief valve 20 to a closed position. A check valve 23 prohibits the return of cylinder fluid via line 16. Variable flow control valve 22, upon being cracked, permits remote pilot relief valve 20 to reposition to pass fluid from the cylinder lower end back to reservoir 7 coincident with lowering of dump body 1. Operator adjustment of flow control valve 22 in the cab controls the rate at which fluid is exhausted from cylinder 5 and hence the speed at which dump body 1 is lowered.

For purposes of convenience the valve components, with the exception of variable control valve 22, may all be located in a single, compact manifold of the type receiving cartridge type valves.

In operation, pump 6 is unloaded via remote pilot relief valve 10 positioned to a low pressure mode by open directional control valve 11. Upon the truck reaching an unloading site, switch 13 is closed by the operator which repositions directional control valve 11 to block pilot line 15 thereby repositioning pump relief valve to a high pressure mode to terminate pump unloading. Pump pressure is accordingly applied to the base end of cylinder 5 resulting in rod extension and the lifting of dump body 1. The pump output is blocked from returning to reservoir 7 via cylinder relief valve 20 by reason of same being in a high pressure mode since variable flow control valve 22 is closed at this time. Switch 14 serves as a limit switch for dump body movement by reason of the same opening a circuit to directional valve 11 at maximum dump body elevation. During lifting of dump body 1, the truck operator may stop and hold the dump body by simply opening switch 13 which returns directional control valve 11 to the FIG. 1 position for pump unloading while check valve 23 prevents exhaust from cylinder 5.

With the pump now being unloaded in a low back pressure condition, lowering of the dump body may be regulated by cracking of variable flow control valve 22 by the operator which pilots cylinder relief valve 20 to a low pressure mode permitting the escape of cylinder fluid therepast and back to reservoir 7. Closure of manual variable control valve 22 by the truck operator stops the descent of dump body 1 at any intermediate position. Cracking of valve 22 enables the low impact return of the dump body onto the truck frame to avoid damaging impact therewith. In one embodiment of the present control system the valve components may be valves manufactured by Modular Controls, Inc. and are of the following types:

Remote pilot relief valves 10 and 20—Model No. 20365 Solenoid actuated directional control valve 11—Model No. SV1-10-0-0-12D Check valve 23—Model No. CV1-16-P-0-5 Flow control valve 22—Model No. NV1-10-K-2

Figure 3:
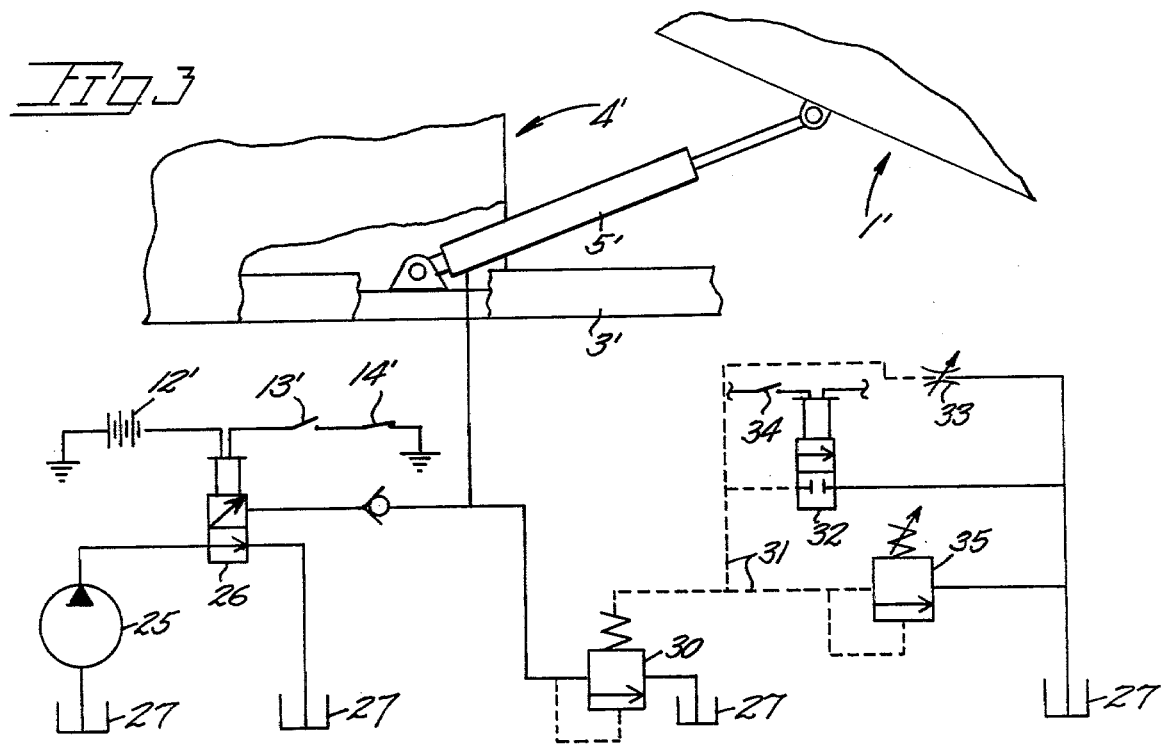
FIG. 3 is a modified dump body control system.

In the modified system of FIG. 3, a pump 25, preferably the truck's accessory powering pump, is unloaded by a two way directional valve 26 back to a reservoir 27. Solenoid actuated valve 26 is in circuit with a power source 12' via an operator actuated, cab located switch 13' and a limit switch 14'. Prime reference numerals in the modified forms of the invention indicate parts corresponding to those identified with like reference numerals in the first described form of the invention.

Fluid under pump pressure is admitted to the base end of cylinder 5' for cylinder extension and lifting of dump body 1'. Raising of dump body 1' is terminated by limit switch 14' or by operator opening of switch 13'.

Dump body lowering is regulated by a remote pilot relief valve 30 the pilot line 31 of which is branched for communication with a directional control valve 32 of the solenoid actuated type and also a manually adjustable flow control valve 33. Solenoid actuated valve 32 is in electrical circuit with an operator controlled switch 34 in the truck cab. Accordingly, dump body lowering may be at a predetermined rate by opening of normally closed solenoid valve 32 to vent pilot line 31 thus opening valve 30 or may be manually regulated by valve 33. In branched communication with relief valve 30 is a manually adjustable, pilot relief valve 35 which protects the entire system from excessive pressure by remotely piloting valve 30 to an open condition upon extreme pressures in pilot line 31.

Figure 4:
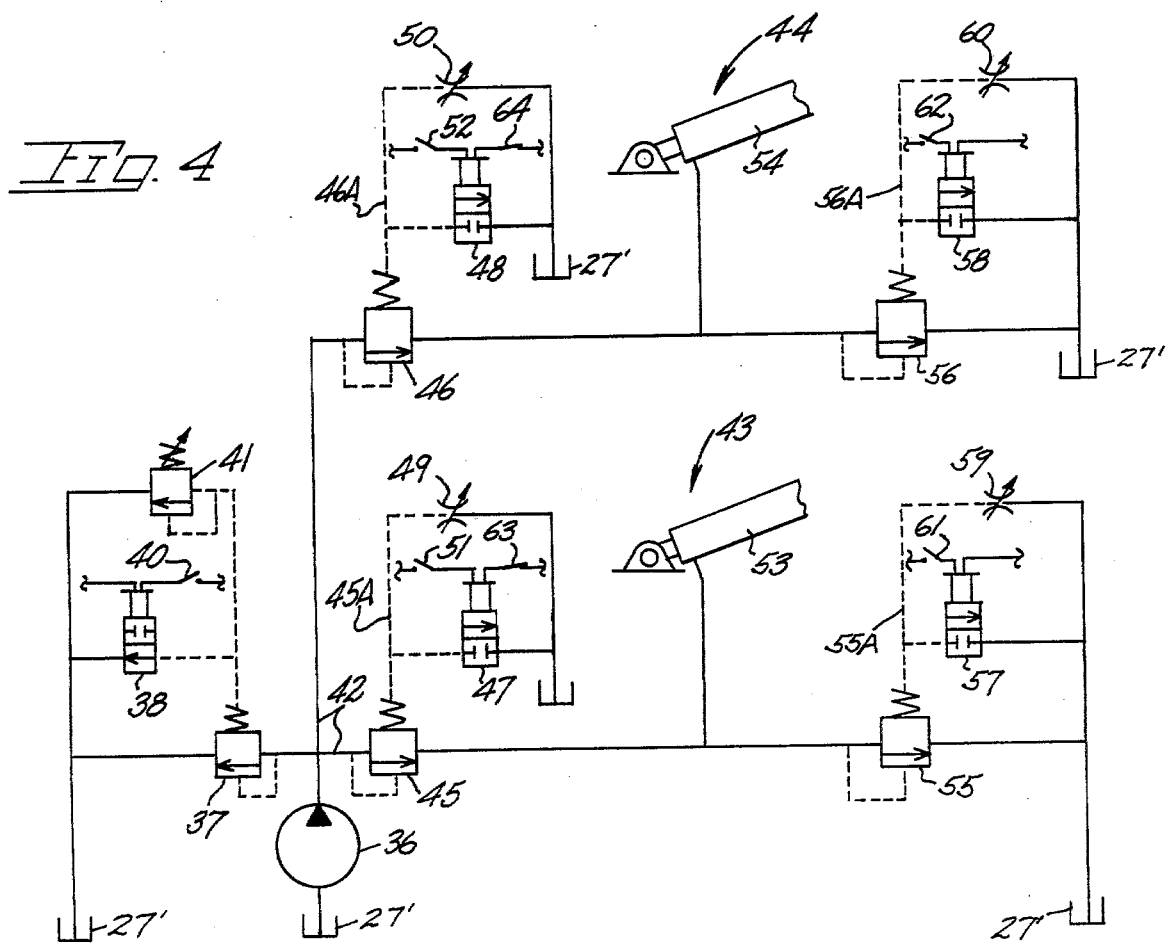
FIG. 4 is a modified dump body control system for truck and trailer dump bodies.

In a further modified system shown in FIG. 4, a pump 36 is unloaded by an unloading circuit including a remote piloted relief valve 37 which is controlled or piloted by a directional flow control valve 38 which is of the two way, solenoid actuated type. Valve 38 is normally open resulting in valve 37 being piloted to an open pump unloading position. Repositioning of valve 38 by actuation of an operator controlled switch 40 in the truck cab serves to close solenoid actuated valve 38 and close piloted relief valve 37 for pressurization of the later described sub-systems.

A manually adjustable relief valve at 41 serves to protect the pump and system from excessive pressures.

A pump discharge line 42 is branched to provide pump pressure to either a truck dump body sub-system at 43 or a trailer dump body sub-system at 44 or simultaneously to both depending on pump capacity.

Each sub-system 43–44 includes respectively a cylinder extension portion including a remotely piloted pressure relief valve at 45–46 having their pilot lines 45A–46A each in communication with a directional flow control valve 47–48 and with a manually adjustable flow control valve 49–50. Opening and closing of the remote pilot relief valves 45–46 in the sub-systems is controlled by cab located switch means 51–52 in circuit with solenoid actuated directional flow control valves 47–48. Lifting speed can also be controlled by manual actuation of flow control valves 49–50. Such regulation of the pilot lines of valves 45–46 serves to regulate fluid flow to dump body lift cylinders 53–54 and the rate of lifting of their associated dump bodies in an independent manner. Limit switches 63–64 are actuated by their respective dump bodies to open the circuit to each solenoid valve 47–48 and reposition same to a closed position.

Each truck and trailer sub-system additionally includes remote pilot relief valves 55–56 having their pilot lines 55A–56A each in communication with a directional flow control valve 57–58 and with a manually adjustable flow control valve 59–60. Opening and closing of relief valves 55–56 in the dump body lowering side of each sub-system is controlled by cab located switch means 61–62 in circuit with solenoid actuated directional control valves 57–58. Lowering can also be controlled by manual actuation of valves 59–60. Such regulation of the pilot lines 55A–56A serves to control valves 55–56 and hence control fluid flow escaping from the dump body lift cylinders 53–54 and the rate of lowering of their associated dump bodies which rates are, of course, independently variable.

Known dump body control systems often include control linkages at least a portion of which are externally mounted on the truck. Accidental contact with such linkages during truck maintenance operations may initiate dump body lowering and consequent risk of injury is incurred. A further drawback to known systems is imprecise control over the dump body and lowering speeds. The present systems advantageously provide for precise dump body control with no operator risk. Provision is made for slowing of the dump body as it approaches its lowermost position to avoid damaging impact with the truck chassis.

While we have shown but a few embodiments of the invention it will be apparent to those skilled in the art that the invention may be embedded still otherwise without departing from the spirit and scope of the invention.

We claim:

1. A hydraulic dump body control system, said system comprising,
   a pump,
   a hydraulic lift cylinder coupled to a truck dump body and in communication with said pump,
   a first relief valve of a remote pilot operated type in upstream communication with said pump,
   a directional control valve of a solenoid actuated type in piloting communication with said first relief valve piloting the last mentioned valve to a closed position for pressurization of said cylinder by said pump and alternatively piloting same open for unloading of pump output to a reservoir, a control circuit for said directional control valve including an operator actuated switch,
   a second relief valve also of a remote pilot operated type in fluid communication with said cylinder, and
   a manually adjustable flow control valve in piloting communication with said second relief valve to permit manually controlled exhausting of fluid from said cylinder to a reservoir and hence lowering of the dump body in a controlled manner.

2. The control system claimed in claim 1 wherein said system additionally includes a check valve preventing cylinder exhausted fluid from returning to said first relief valve.

3. The control system claimed in claim 1 wherein said control circuit for said directional control valve additionally includes a limit switch actuated by the truck dump body.

4. A hydraulic dump body control system, said system comprising,
   a pump,
   a dump body lift cylinder coupled to a dump body and in communication with said pump,
   a directional control valve of a solenoid actuated type in a first position serving to unload the pump to a reservoir and in a second position communicating pump pressure to the lift cylinder to raise the dump body,
   an operator actuated switch in circuit with said directional control valve,
   a remote pilot relief valve also in communication with said lift cylinder and controlling fluid flow therefrom,
   a second directional control valve of a solenoid actuated type in communication via a pilot line with said remote pilot relief valve to control opening and closing of the last mentioned valve, and
   a second operator actuated switch in circuit with said second directional control valve to actuate same to thereby pilot said relief valve to open and closed positions.

5. The system claimed in claim 4 additionally including a manually adjustable flow control valve also in communication via the pilot line with said remote pilot relief valve for control of same singly or combined with said second directional control valve.

6. The system claimed in claim 5 additionally including a manually adjustable relief valve in communication via the pilot line with said remote pilot relief valve to protect the system from extreme pressures.

7. A hydraulic dump body control system for a dump truck and a dump trailer, said system comprising,
   a pump,
   dump body lift cylinders one each coupled to a truck dump body and to a trailer dump body,
   a pump unloading circuit including a remote pilot relief valve, a directional control valve of a solenoid actuated type in piloting communication with said remote pilot relief valve, an operator actuated switch in electrical circuit with said directional control valve,
   truck and trailer hydraulic sub-systems each served by said pump and including a cylinder extension portion and a cylinder retraction portion for respectively raising and lowering the dump bodies, each of said sub-system extension and retraction portions including,
     a remote pilot relief valve,
     a solenoid actuated directional control valve in piloting communication with said remote pilot relief valve,
     an operator actuated switch in circuit with each of said solenoid actuated directional control valves to provide operator control of the extension and retraction portions of each system.

8. The control system claimed in claim 7 wherein said cylinder extension portion of each sub-system includes a dump body actuated limit switch in circuit with the solenoid actuated directional valve of the extension portion to terminate cylinder extension upon the dump body reaching a predetermined position.

9. The control system claimed in claim 8 wherein each of said sub-system extension and retraction portions further includes a manually adjustable flow control valve.

* * * * *